(12) United States Patent
Dardashti et al.

(10) Patent No.: US 6,364,129 B1
(45) Date of Patent: Apr. 2, 2002

(54) ADJUSTABLE MULTIMEDIA STORAGE RACK

(76) Inventors: Shahriar Dardashti; Luisa Sze-Man Mok, both of c/o Atlantic Inc., P.O. Box 2399, Santa Fe Springs, CA (US) 90670

( * ) Notice: Subject to any disclaimer, the term of this patent is extended or adjusted under 35 U.S.C. 154(b) by 0 days.

(21) Appl. No.: 09/704,206

(22) Filed: Nov. 1, 2000

Related U.S. Application Data

(62) Division of application No. 09/302,739, filed on Apr. 30, 1999.

(51) Int. Cl.$^7$ ............... B23P 11/00; A47G 29/00
(52) U.S. Cl. ............... 211/40; 211/189; 211/90; 211/41.12; 29/525.11; 29/525.12; D6/407
(58) Field of Search ............... 29/525.11, 525.12

(56) References Cited

U.S. PATENT DOCUMENTS

| | | | | |
|---|---|---|---|---|
| 3,899,228 | A | | 8/1975 | Schreiber ............... 312/257 |
| 3,928,905 | A | * | 12/1975 | Atwater ............... 29/446 |
| 4,223,966 | A | | 9/1980 | Winters ............... 312/140 |
| 4,282,977 | A | | 8/1981 | De Lorenzo ............... 211/74 |
| 4,444,321 | A | | 4/1984 | Carlstrom ............... 211/186 |
| 4,624,373 | A | * | 11/1986 | Caron ............... 211/41.12 |
| 4,646,923 | A | | 3/1987 | Winter et al. ............... 211/189 |
| 4,650,261 | A | | 3/1987 | Winter et al. ............... 312/140 |
| 4,730,740 | A | | 3/1988 | Winter et al. ............... 211/189 |
| 5,035,332 | A | | 7/1991 | Stravitz ............... 211/40 |
| 5,191,986 | A | | 3/1993 | Huizenga ............... 211/189 |
| D348,366 | S | | 7/1994 | Stravitz ............... D6/476 |
| D355,795 | S | | 2/1995 | Stravitz ............... D6/465 |
| D364,047 | S | | 11/1995 | Bucher ............... D6/407 |
| 5,622,272 | A | | 4/1997 | Orlando, Jr. ............... 211/90 |
| 5,662,399 | A | | 9/1997 | Henkel et al. ............... 312/258 |
| D414,069 | S | | 9/1999 | Fok ............... D6/630 |
| 5,992,647 | A | | 11/1999 | Malik ............... 211/34 |
| 6,178,725 | B1 | * | 1/2001 | Sperry et al. ............... 53/451 |

OTHER PUBLICATIONS

*Atlantic 98 Catalog*, pp. 9 and 10, copyright 1998.

* cited by examiner

Primary Examiner—Alvin Chin-Shue
Assistant Examiner—Khoa Tran
(74) Attorney, Agent, or Firm—Oppenheimer Wolff & Donnelly LLP

(57) ABSTRACT

A first support construction has first and second columns of openings on a face thereof, and a second support construction has third and fourth columns of openings on a face thereof. A first horizontal cross member is removably attached at opposite ends in corresponding openings in the first and third columns, and a second horizontal cross member is removably attached at opposite ends in corresponding openings in the second and fourth columns. A first spacer member is removably attached to the first support construction via two rearward pegs in two openings in the first column. With an end of a third horizontal cross member attached to a forward peg of the first spacer member, the vertical plane of the third horizontal cross member is spaced between the vertical planes of the first and second columns. Similarly, a second spacer member is removably attached to the first support construction via two rearward pegs in two openings in the third column. With an opposite end of the third horizontal cross member attached to a forward peg of the second spacer member, the axis of the third horizontal cross member is spaced between the vertical planes of the third and fourth columns. The first, second and third horizontal cross members are thereby positioned in different horizontal planes and different vertical planes and form an article support cradle. The first and second spacer members allow the first and third columns to be used for both the first and third cross members so that additional columns of openings are not needed in the first and second support constructions. The storage rack is preferably provided to the end user completely "knocked down" and in a box, ready for easy assembly into the desired cradle arrangement.

4 Claims, 9 Drawing Sheets

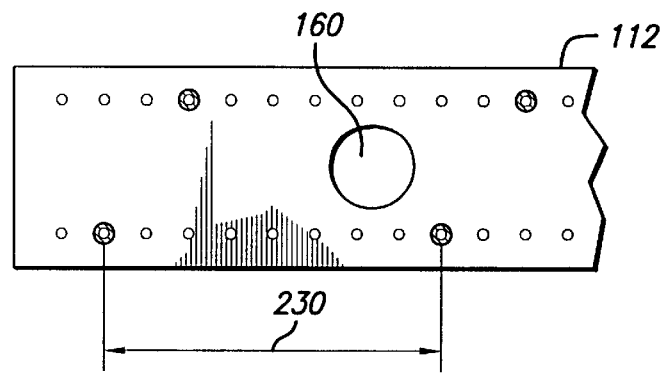
FIG. 8A
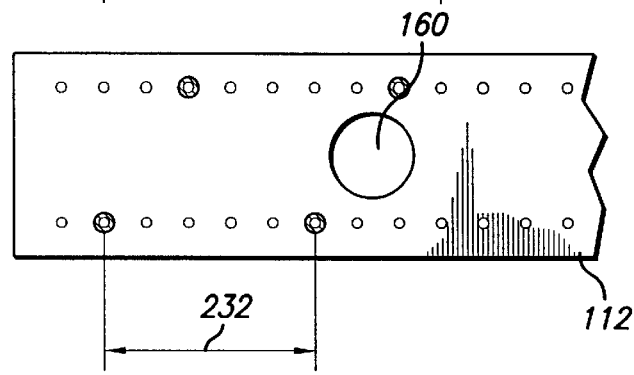
FIG. 8B
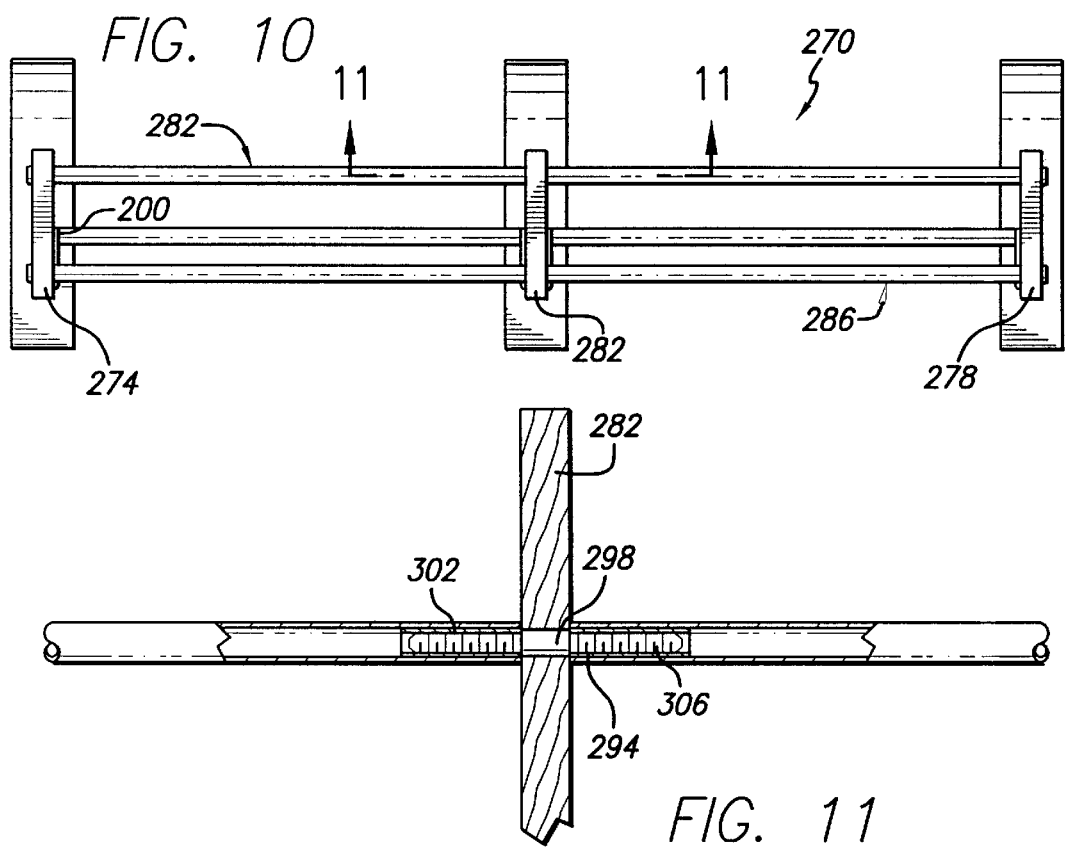
FIG. 10
FIG. 11

ADJUSTABLE MULTIMEDIA STORAGE RACK

CROSS-REFERENCE TO RELATED APPLICATION

This is a divisional of copending U.S. patent application Ser. No. 09/302,739, filed Apr. 30, 1999.

BACKGROUND OF THE INVENTION

Storage systems for storing and displaying VCR tapes, CDs, cassettes and other media are in great demand as people look for ways of efficiently storing and displaying their media. One type of prior art storage rack provides a plurality of sets of three horizontal rods, one set above the other and supported between side stanchions. The rods of each set are offset from one another in both horizontal and vertical planes to form a cradle in which the media are held against one another, like books on a bookshelf but lying back at an angle. The angled disposition makes the titles of the media on their front edges easier to read and prevents the media from falling out of the rack. Examples of such storage racks are the PENGUIN line of storage racks available from Atlantic, Inc. of Santa Fe Springs, Calif. These are attractive knockdown racks available in different sizes to accommodate different numbers of CDs. Expansion and stackable models are also available. Unfortunately, these racks are not adjustable by the user to hold different sizes and types of media as his/her needs and desires change.

SUMMARY OF THE INVENTION

Directed to remedying the disadvantages of the prior art, disclosed herein is an adjustable multimedia storage rack. The rack can be easily adjusted by the user to hold different sizes and numbers of media as the user may desire from time to time. For example it can be adjusted to hold a row of CDs, a row of videocassettes, a row of small books, and a row of large books. This is accomplished by changing the relative positions of the horizontal rods of each set to form different sizes of holding "cradles."

Each of the end stanchions or support members of the racks of this invention has front and back columns of holes on inwardly disposed faces thereof. The back rod is releasably attached in a horizontal position at both ends thereof to the corresponding holes in the back columns of both support members. Similarly, the front rod is releasably attached in a horizontal position at both ends thereof to the corresponding holes in the front columns of both support members, but in a horizontal plane below that of the back rod.

A pair of small spacer members are provided, each having a pair of back pegs on a back surface thereof and a front peg on a front surface thereof with the front peg being offset a distance from the plane of the back pegs. The front peg is inserted in an end of the middle rod. The back pegs are inserted in holes of the back column below the back rod with the front peg extending inwardly and in a vertical plane between the vertical planes of the front and back rods.

The other spacer member is similarly mounted in corresponding holes in the other support member, and the front peg of the other spacer member is inserted in the other end of the middle rod. The middle rod is thereby horizontally disposed below the front and back rods, and spaced forward a distance from the vertical plane of the back rod. This distance is defined by the offset distance of the front pegs. The space between the middle and back rods defines the location of the rear lower corners of the media when stored in the cradles.

The location of the three rods on the stanchions and the relative positioning of the rods, one above the other can be changed as desired by the user. Thus, the user can change the relative positioning and sizes of the cradles, as and when he/she desires.

It is also within the scope of the invention to have three stanchions—two end stanchions and a middle stanchion—all parallel to one another. A first set of rods including spacer members extends between one end stanchion and a middle stanchion, and a second set of rods with spacer members extends between the other end stanchion and the middle stanchion. All of the rods of the first and second set can be out of alignment with each other; in other words, none of the rods of the first and second sets enters into the same opening in the middle stanchion from both sides thereof. Alternatively, one, some or all can be aligned. In that case special screws are provided having center body portions and opposing threaded ends. These "screws" are inserted into the pertinent openings in the middle stanchion, with threaded ends sticking out on opposite sides. The rods of the first set are screwed into one of the threaded ends, and the rods of the second set are screwed into the opposite threaded ends.

A further invention disclosed herein is the adjustable storage rack support construction, which includes an upright panel having on a surface thereof first and second spaced vertical lines of openings and a foot attached at a bottom end of the panel, such as with screws. The openings can each be through-holes extending an entire thickness through the panel. The first and second lines of openings can extend substantially an entire length of the panel, and can be adjacent respective opposite side edges of the surface of the upright panel. A toe portion of the foot can extend out beyond a forward edge of the panel, and a heel portion of the foot can extend back beyond a rearward edge of the panel. The panel can be made of multi-density fiber.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIGS. 8A and 8B are elevational views of the support panels of the rack of FIG. 7 showing two alternative rod positions;

Figure 9:
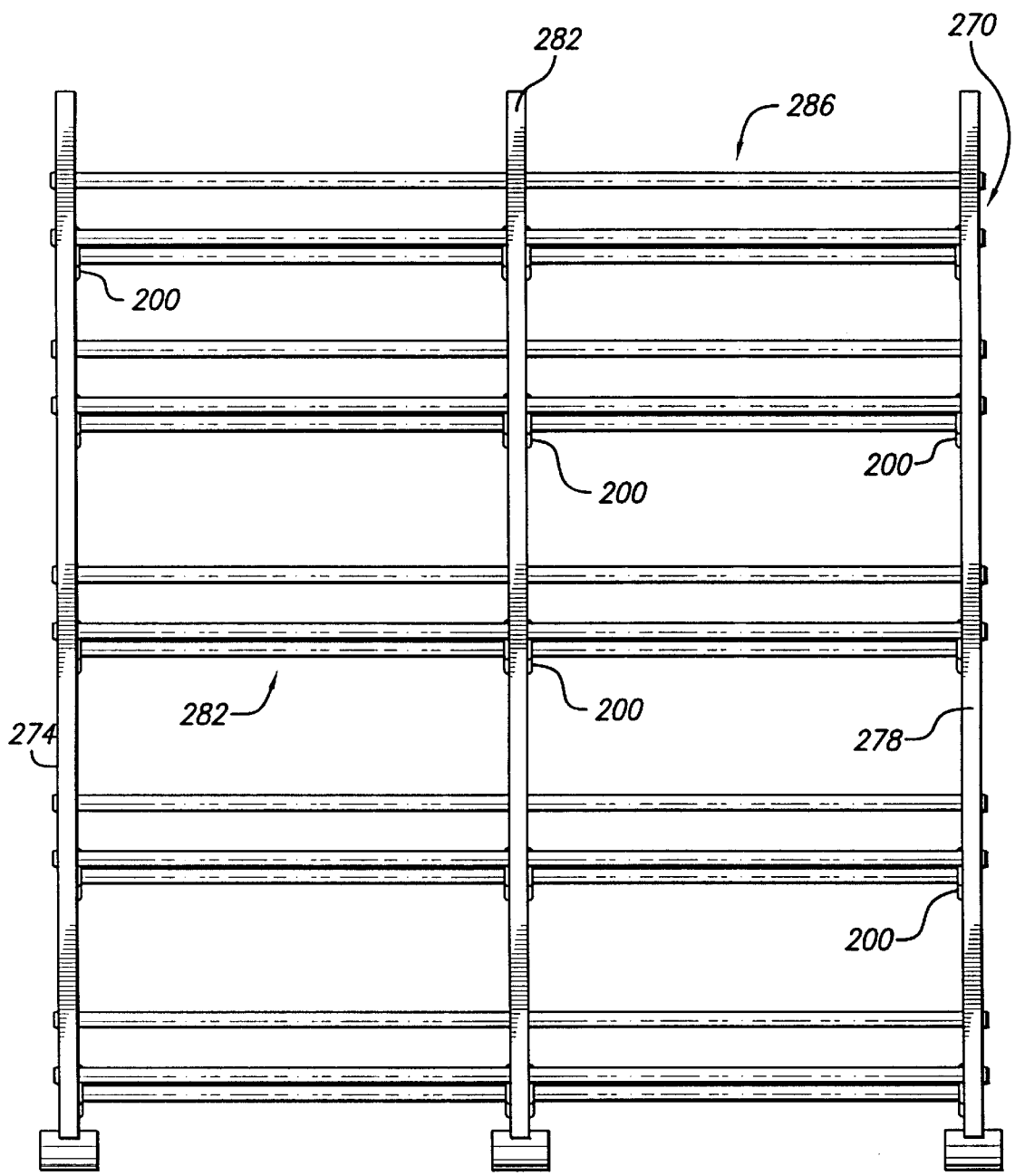

a FIG. 9 is a front elevational view of an alternative adjustable multimedia storage rack of the present invention;

FIG. 10 is a top plan view of the rack of FIG. 9;

FIG. 11 is an enlarged cross-sectional view taken on line 11—11 of FIG. 10; and

Figure 12:
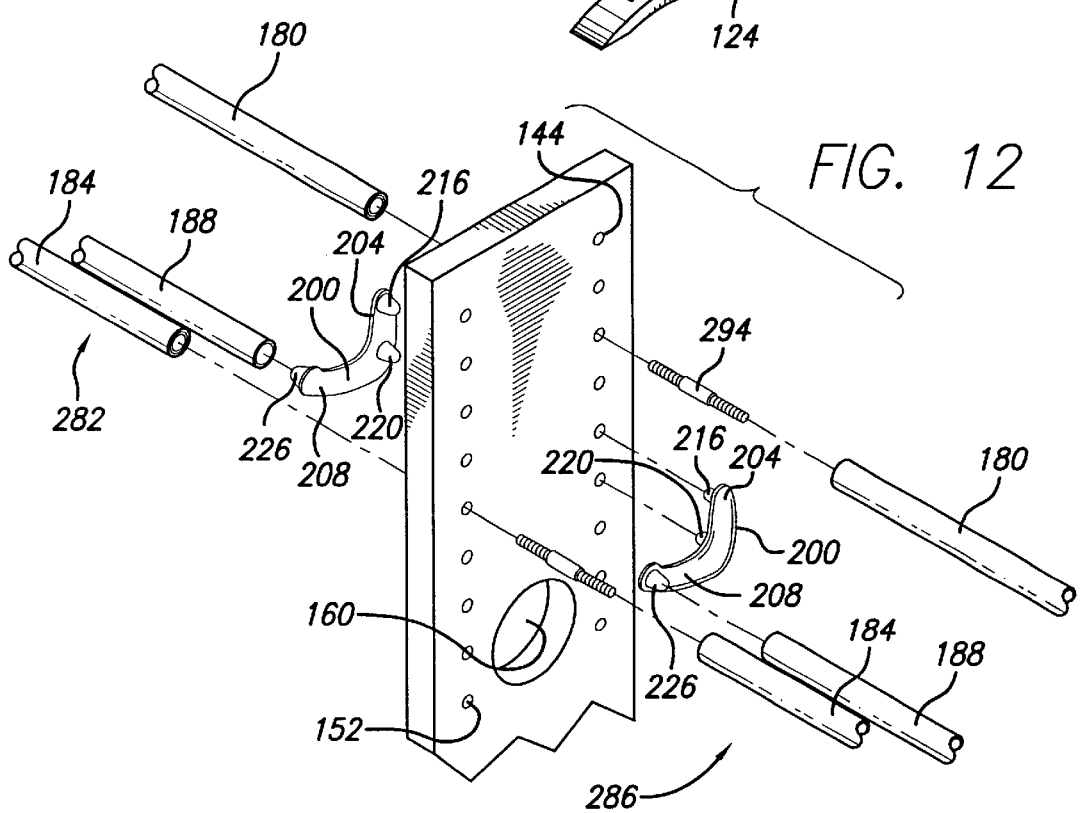

FIG. 12 is an exploded perspective view of a top middle portion of the rack of FIG. 9.

DETAILED DESCRIPTION OF PREFERRED EMBODIMENTS OF THE INVENTION

Figure 1:
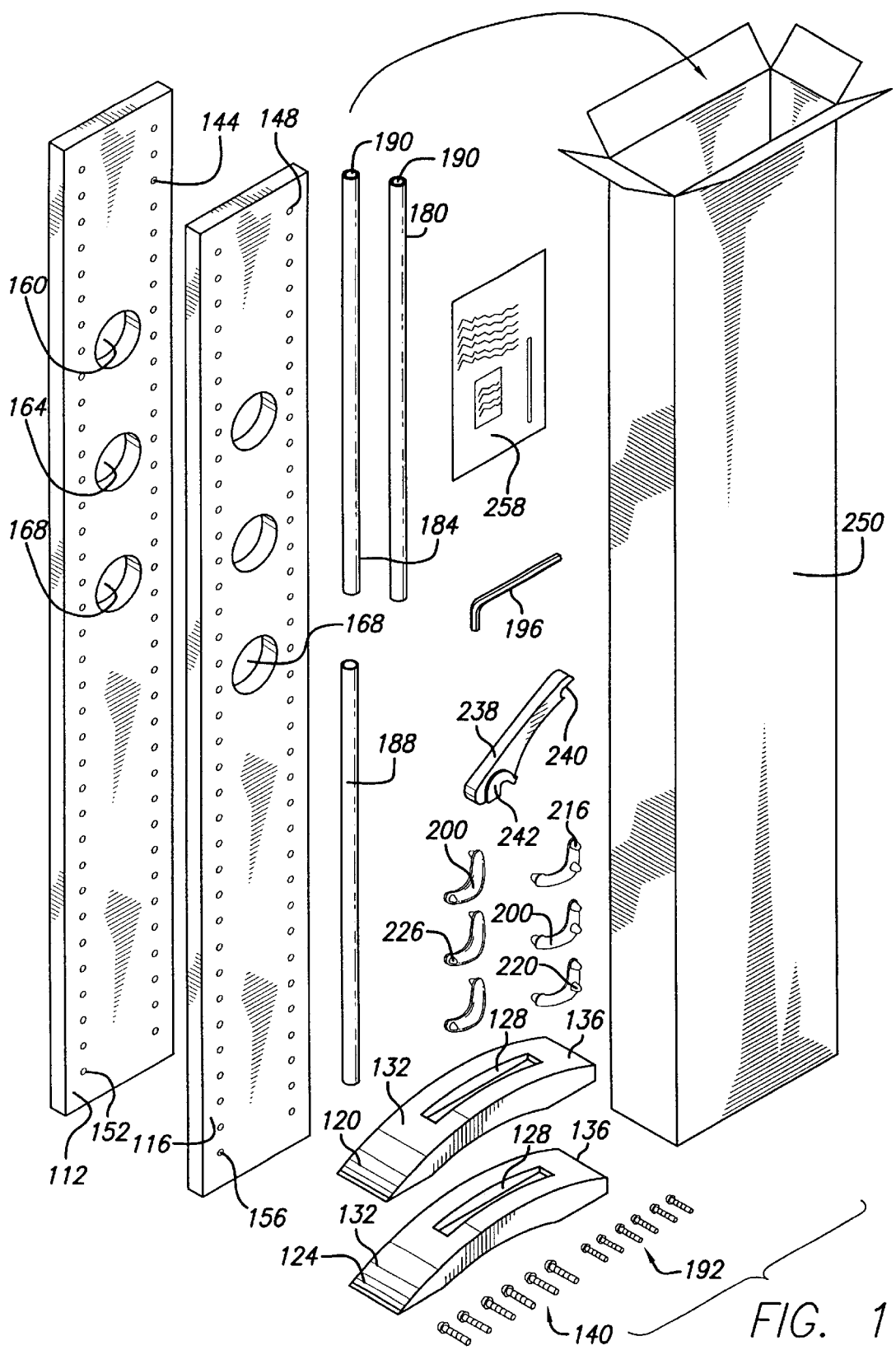
FIG. 1 is a perspective view of many of the components of an adjustable multimedia storage rack of the present invention after having been removed from a storage container and ready for assembly.
Figure 2:
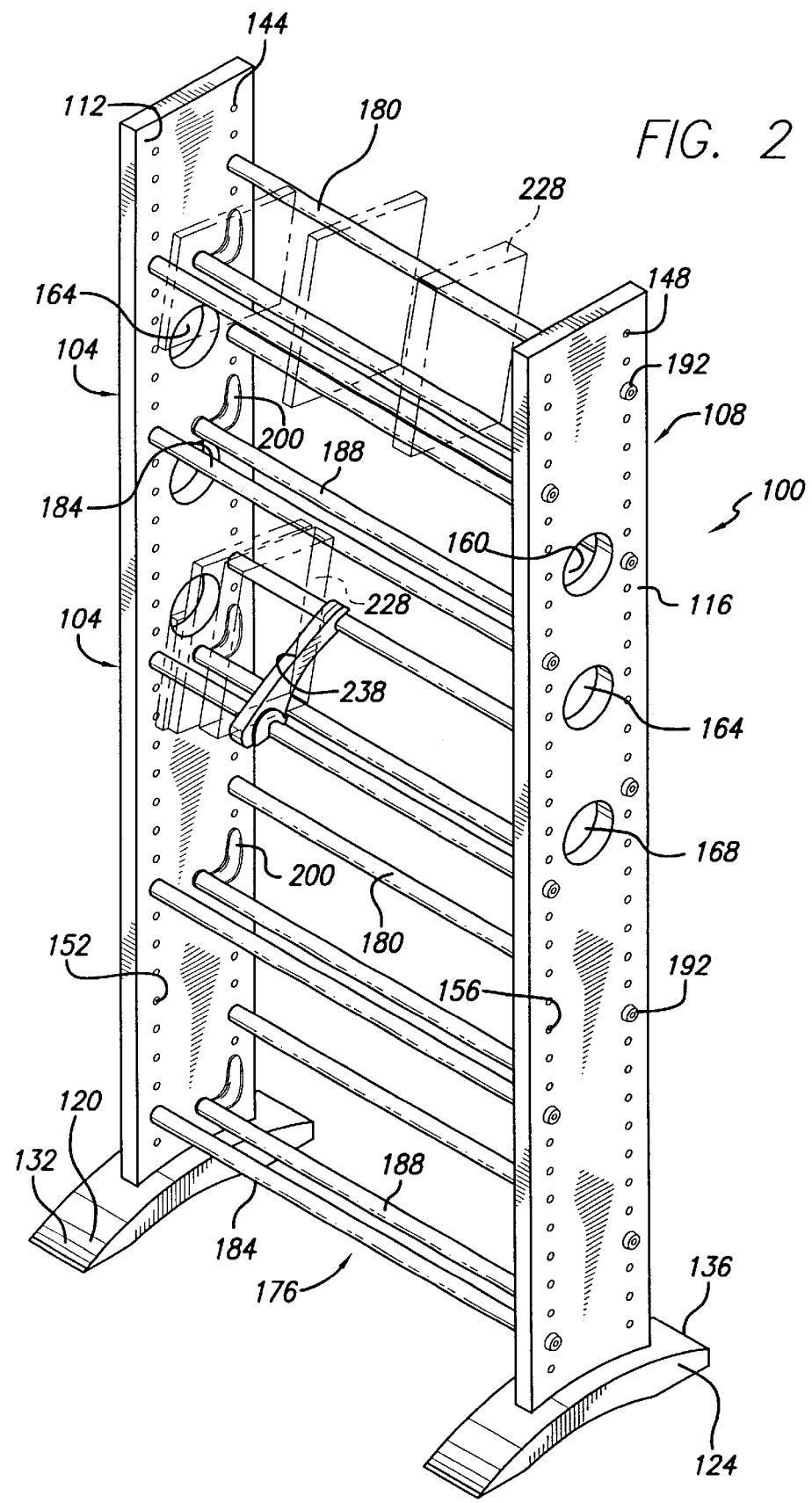
FIG. 2 is a front perspective view of an (assembled) adjustable multimedia storage rack of the present invention.

Referring to FIG. 2, for example, an adjustable multimedia storage rack of the present invention is illustrated generally at 100. Rack 100 includes first and second support constructions, shown generally at 104 and 108, respectively. The support constructions 104, 108 include respective upright panels 112, 116 and feet 120, 124. The panels 112, 116 are each about six inches wide, one half inch thick, and almost four feet long. The feet 120, 124 have top longitudinal slots 128 (FIGS. 1 and 3) between toe and heel portions 132, 136.

Figure 3:
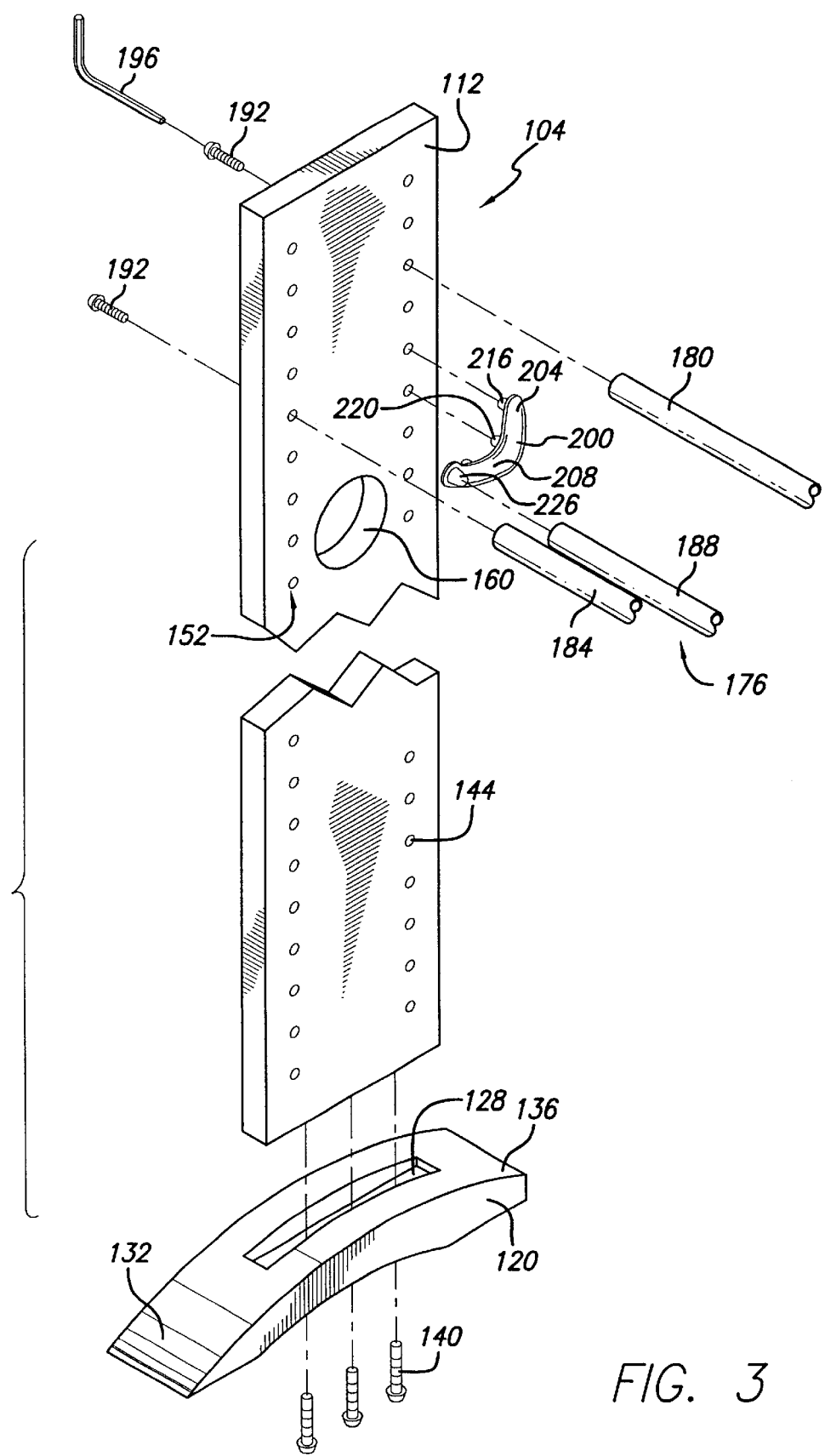
FIG. 3 an exploded perspective view of the top left corner of the storage rack of FIG. 2.
Figure 4:
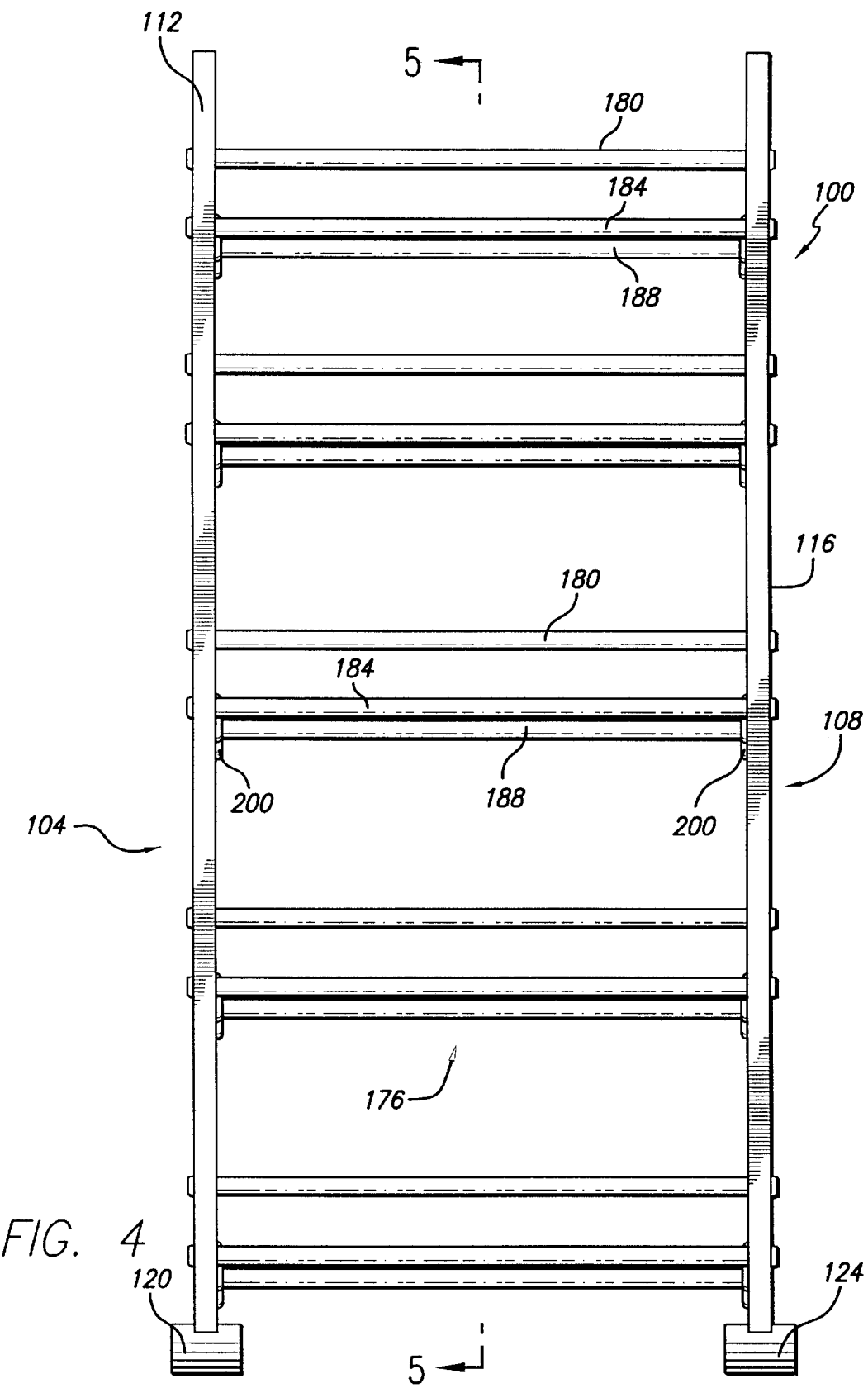
FIG. 4 is a front elevational view of the storage rack of FIG. 2.

Referring to FIG. 3, bottom ends of the panels 112, 116 are inserted into slots 128 of respective feet 120, 124. Screws 140 are inserted up through holes in the slots 128 and screwed into aligned holes in the bottom surfaces of the panels 112, 116, which can be multi-density fiber constructions. The feet 120, 124 are thereby (releasably) secured at center portions to the bottoms of the panels 112, 116 with the toe portions 132 extending forward of front edges of the panels and the heel portions 136 extending rearward of back edges of the panels. The feet 120, 124 are wider than the panels 112, 116. Thereby the wide feet 120, 124 with their outwardly-extending toe and heel portions 132, 136 provide stability to the panels 112, 116, allowing both of them to be self-standing. Alternatively, the feet can be permanently affixed to the panels. A further alternative uses different bracing support constructions than the feet 120, 124 as would be apparent to those skilled in the art from this disclosure.

Each of the panels 112, 116 has a rear series of through-holes 144, 148 (or openings engaging an inward panel surface) and a front series of through-holes 152, 156 (or openings engaging an inward panel surface), respectively. The rear series of through-holes 144, 148 and the front series of through-holes 152, 156 are arranged as parallel vertical columns, with the rear series 144, 148 being proximate to rear surfaces or edges of the panels 112, 116, and the front series 152, 156 being proximate to front surfaces or edges of the panels.

The panels 112, 116 can also be provided with large through-openings 160, 164, 168 arranged one above the other and centered between the rear and series of through-holes, in a decorative "stop light" fashion. The through-openings 160, 164, 168 are each about two and a quarter inches in diameter and thus reduce the weight of the panels 112, 116 a little without compromising structural integrity. They also provide a means for quickly identifying the top and the bottom of the panels 112, 116 for quicker assembly of the storage rack 100. They further are decorative and may serve as source identifiers (trademarks) for the rack 100.

Figure 6:
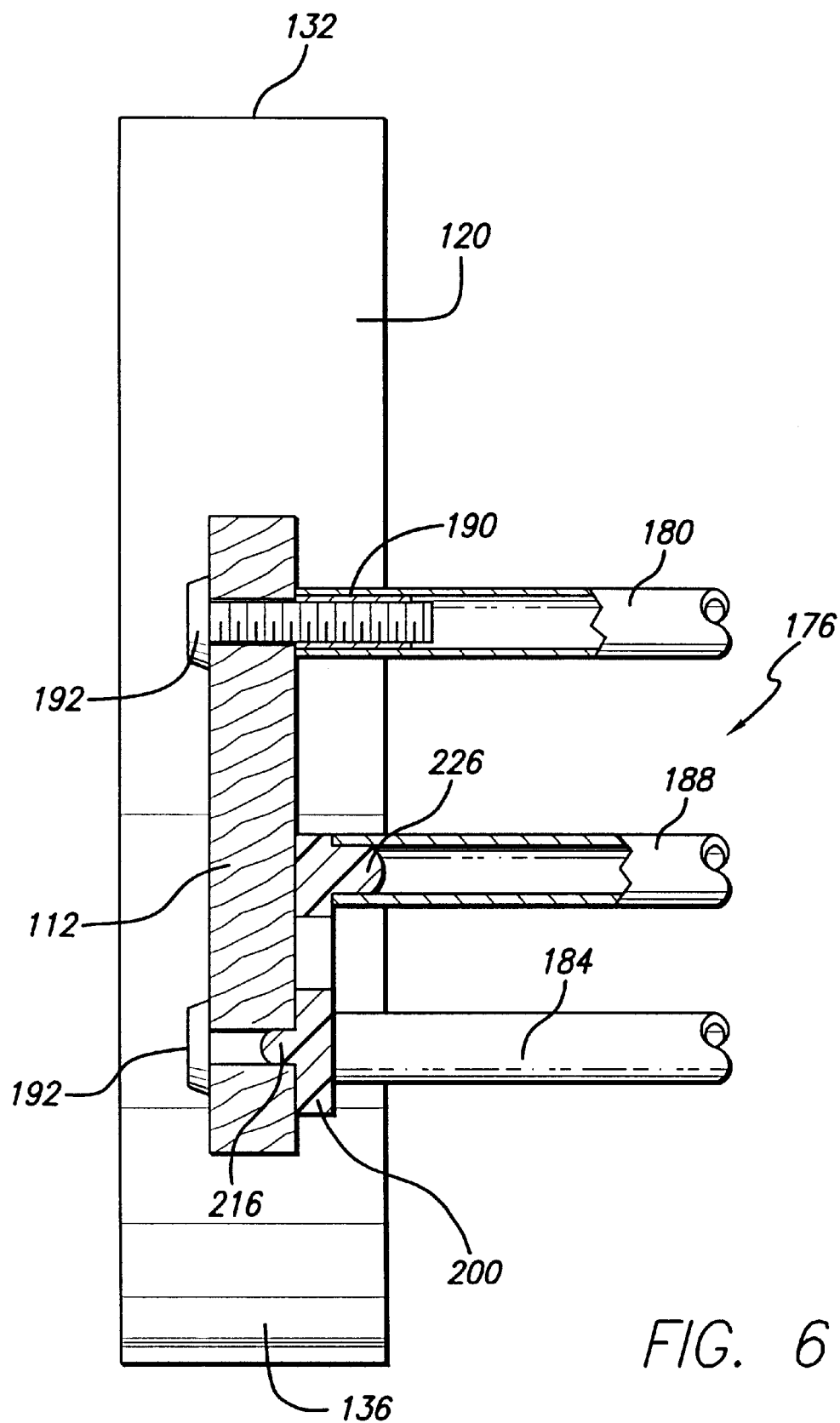
FIG. 6 is an enlarged cross-sectional view taken on line 6—6 of FIG. 5.

The adjustable multimedia storage rack 100 further includes a plurality of sets of three horizontal cross-members or rods. Each set 176 of rods includes when installed in the rack 100, an upper rear rod 180, a middle front rod 184 and a lower center rod 188. One arrangement of the rods as depicted in FIG. 2 consists of five rod sets 176. All of the rods 188 of all of the sets are identical hollow metal tubes with open ends. All of the rods 180, 184 of the sets are identical. They, for example, can be constructed as hollow steel metal tubes with hollow threaded end inserts 190 (FIG. 6). Alternatively, the rods 180, 184, 188 can be solid rods with hollow end openings.

To (releasably) secure rods 180 and 184 to the panels 112, 146, the desired height or level of the rods is chosen. The rods 180 and 184 are then aligned with the through-holes at the desired heights. Rod 180 is aligned with the through-holes of the rear series 144, 148 in the panels 112, 116 at the same desired height and positioned against inward faces of the panels.

Screws 192 are then inserted into the through-holes through outward faces of the panels 112, 116 and into the threaded inserts 194 (FIG. 6) and screwed therein using a tool 196, as shown in FIG. 3.

Spacer members 200 are provided pursuant to this invention, one for each end of the lower center rod 188 of each the sets 176. As can be seen in the drawings, the spacer members 200 include first and second body portions 204, 208 formed together at an angle with an elbow and together defining a boomerang-type shape. The first body portion 204 has a rear face with two rear pegs 216, 220 extending out therefrom. The second body portion 208 has a front face with a front peg 226 extending out therefrom. The first body portion 204 is approximately one and three quarter inches long; the second body portion 208 is approximately two and a half inches long; the pegs 216, 220, 226 are each approximately one-quarter inch long with the front peg 226 being fatter than the rear pegs; and the rear pegs 216, 220 are spaced approximately one-and-a-quarter inches apart. The spacer members 200 can be formed as a molded plastic construction. Alternatively, the two body portions 204, 208 can be connected together with an adjustable hinged arrangement (not shown), to allow the angular relationship to be adjusted to accommodate different situations. Mirror image left and right spacer members are provided.

Figure 5:
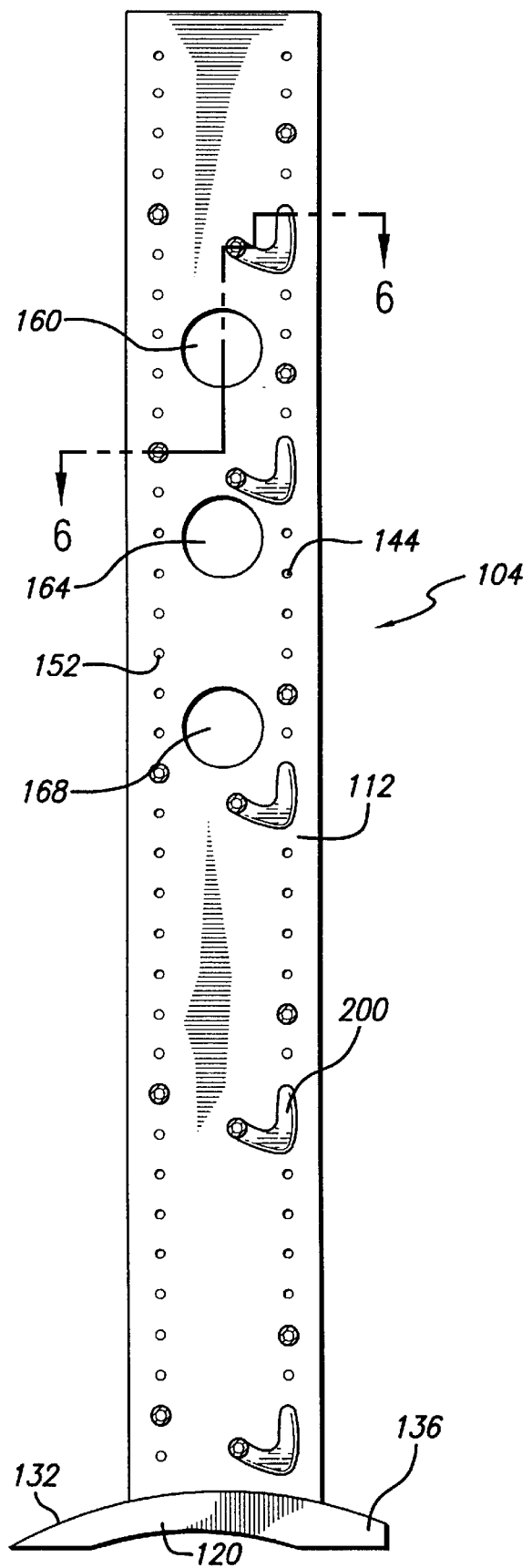
FIG. 5 is a cross-sectional view taken on line 5—5 of FIG. 4.

The spacer members 200 are used to mount the lower central rods 188 to the first and second support constructions 104, 108. Referring to FIG. 3, rear pegs 216, 220 are inserted into through-holes in the first series of holes 144 (and 148), and the front peg 226 is inserted into an end of the rod 188. This is done for both ends of the rod 188 (with left and right hand spacer members) and to both of the panels 112, 116. Thereby, the central rod 188 is (releasably) attached to and extending between the panels 112, 116 as can be understood from FIG. 6. They are attached at a location between the front and rear series of holes 144, 148, and at a location slightly rearward of the center line of the panels, as depicted in FIG. 5. The distance that the central rod 188 is offset horizontally from the rear series of holes is determined by the distance between the front peg 226 and the plane of the rear pegs 216, 220.

A less preferred design of the spacer member (not shown) has two rearward pegs, one for one series of holes and the other for the other, with the forward peg disposed between them. A further alternative construction (also not shown) instead of side support panels (112, 116) uses first and second strips including the series of holes, the strips being interconnected with bracing. A bottom longitudinal brace member can extend between the side supports for the further alternative construction.

In other words, the spacer members 220 allow for only two (vertical) series of holes to be needed instead of three, to position the rods 180, 184 and 188 in different spaced vertical planes. A third series of holes would require an additional manufacturing step for the panels, may slightly weaken the panels and cannot be used when the large openings 160, 164, 168 are used. Additionally, it is easier to use the spacer members 200 to attach the rod 188 than it is to attach it with screws (192) at both ends. The spacer members 200 are simply aligned with the desired holes and snapped into place; no screwing is needed.

With the central rod 188 and the rear and front rods 180, 184 in position between the first and second support constructions 104, 108, the rods are positioned in different horizontal as well as vertical planes. Thereby, each set 176 defines an article support cradle, adapted to hold therein a row of flat articles 228, each tilted back at a slight angle, as can be seen in dashed lines in FIG. 2 and in solid lines in FIG. 7. The tilt prevents the articles 224 from falling forwardly out of the rack 100 and also makes any identifying indicia on the forward spines of the articles easily readable by a user standing in front of the rack 100.

Figure 7:
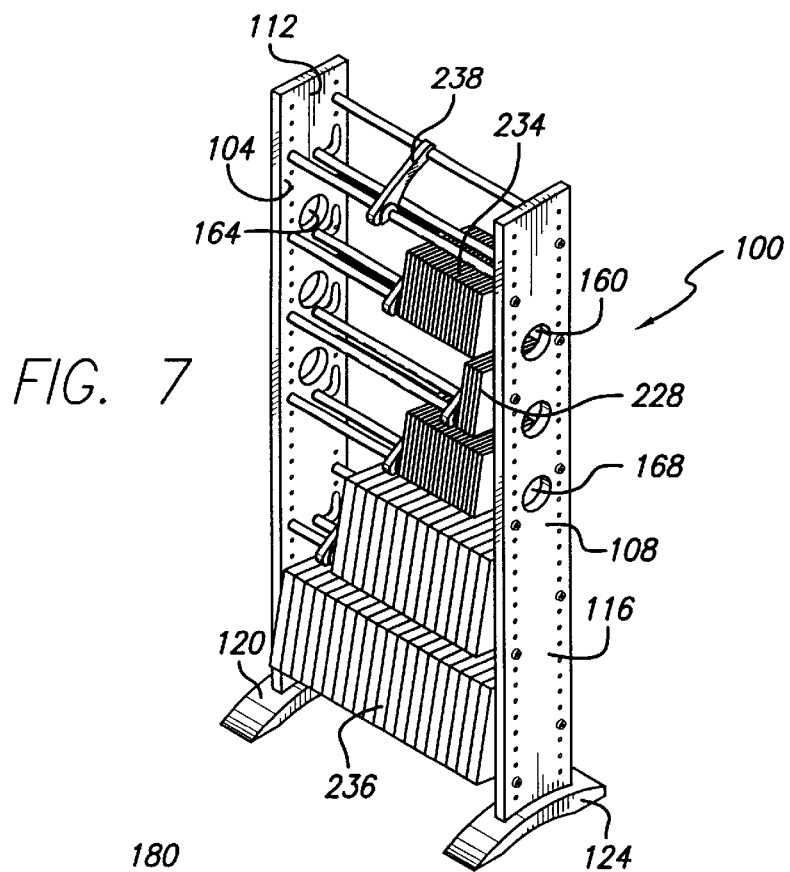
FIG. 7 is a front perspective view of the rack of FIG. 2 showing an alternative positioning of the rods thereof to accommodate and hold rows of different media depicted therein.

FIG. 7 illustrates that with different sizes and orientations of the cradles (or more particularly different relative positionings of the rods 180, 184, 188 of each set 176) that the cradles can be adapted to store different sizes and types of articles. For example, rows of DVDs, CDs, VCR tapes, books and/or other media can be held in a single rack 100, as needed or desired by the individual user, simply by the selection of the holes used for each of the rods, in each of the sets. FIG. 8A shows the spacing of rods 180, 184 with the spacing between adjacent rods as shown by reference numeral 230 being eight holes or approximately ten inches for DVDs. In contrast, spacing 232 as illustrated in FIG. 8B for CDs is only five holes.

FIG. 7 shows the rack 100 adapted to hold CDs 234 and video cassettes or DVDs 236. Snap-on (wood) dividers 238 are used to hold the media upright and against each other, similar to book ends. As is known in the prior art, the top hooks 240 of the dividers 230 are hooked on the back rod 184 and the dividers are pivoted down and snapped by snaps 242 on to the front rod 180. As the user over time acquires or disposes of one or more of a type of media, his/her storage needs for the rack 100 will change. This may require that the cradle sizes be changed. This change can be easily made by the user by removing the end screws 192 for rods 180 and 184 and pulling out the spacer members 200 for rod 188; the rods 180 and 184 are then repositioned and screwed into place, and the rear pegs 216, 220 of the spacer members 200 at the end of rod 188 are fitted in the desired holes in the panels. To reposition the center rods 188, the screws for the rods 180, 184 need only be loosened and not removed entirely. Also, the user may want to vary the ,look, provided by the rack 100 by changing the media held in it or rearranging the media 228 held in it, and the cradles can be adjusted by changing the positioning of the rods 180, 184 in the rear and front series of holes and the positioning of the spacer members 200 in the rear series of holes.

The rack 100 is preferably sold, distributed or otherwise provided to the consumer or end user in a knocked down and boxed condition, as can be understood from FIG. 1. Referring thereto, the box is shown at 250, and delivered in the box are the various components of the rack 100 including two panels 112, 116 the spacer members 200 (seven left hand and seven right hand), fourteen rods 180, 184, seven rods 188, one tool 196, six screws 140, twenty-eight bolts 192, seven dividers 230, two feet 120, 124 and a sheet of instructions 258. Instead of the instructions being provided on a separate sheet 258, they can be printed directly on the box 250.

Rack 100 has two support constructions 104, 108. It is within the scope of the invention to provide three support constructions as shown in FIGS. 9 and 10 by the rack as shown generally at 270. Adjustable multimedia storage rack 270 includes left and right end support constructions 274 and 278, similar to firsthand second support constructions 104, 108. However, it also includes a center support construction 282, which can be identical to and thus interchangeable with end support constructions 274 and 278.

Rack 270 further includes a first group shown generally at 282 of sets of rods 176 (which include upper rear rods 180, middle front rods 184 and lower center rods 188), and a second group shown generally at 286 of sets of rods 176. The sets of the first group 282 are installed between the end support construction 274 and the center support construction 282, and the sets of the second group 286 are installed between the center support construction 282 and the end support construction 278. If the rods 180 and 184 of the first and second groups 282, 286 do not use the same through-holes in the center support construction 282, then they can be installed using the screws similar to rack 100. However, when the rods 180 and 184 of the first and second groups 282, 286 are to use the same through-holes in the center support construction 282 (that is, from opposite faces of the panel of the center support construction), a different attachment system is needed.

Accordingly, provided herein and as best shown in FIGS. 11 and 12 are double-end screws 294, each having a central cylindrical body portion 298 and opposing threaded ends 302, 306. The double-end screws 294 are inserted in the desired through-hole so that the body portion 298 is centered in the through-hole as best depicted in FIG. 11, with threaded ends 302, 306 extending out from the opposite faces of the panel of the center support construction 282. The rods 180, 184 can be screwed onto the extended threaded ends 302, 306 and into position relative to the center support construction. The spacer members 200 are inserted via their pegs 216, 220 as described earlier into holes of the first series corresponding to the desired location of the rod 188. The rear pegs 216, 220 of the spacer members 200 can be short, with lengths less than half the thickness of the panel of the center support construction 282. This allows spacer members 200 to be attached at the same locations and to the same through-holes but on opposite sides of the panel of the center support construction 282.

From the foregoing detailed description, it will be evident that there are a number of changes, adaptations and modifications of the present invention which come within the province of those skilled in the art. As an example, the components of the present adjustable multimedia storage rack can be made of different materials than those mentioned above. Also, more than two or three support constructions can be used in a single rack. Further, the rack can be scaled up or down as needed; it may include only a single set of rods, for example. However, it is intended that all such variations not departing from the spirit of the invention be considered as within the scope thereof.

What is claimed is:

1. A method of assembling a storage rack, comprising the steps of:

(1) providing an adjustable storage rack including (a) a first support construction having a first series of openings and a second series of openings, (b) a second support construction having a third series of openings and a fourth series of openings, (c) a first spacer member, (d) a second spacer member, and (e) first, second and third cross members;

(2) positioning the first cross member to extend between the first and second support constructions and to be secured at opposite ends thereof in a first opening of the first series and a first opening of the third series;

(3) positioning the second cross member to extend between the first and second support constructions and to be secured at opposite ends thereof in a first opening of the second series and a first opening of the fourth series;

(4) positioning the first spacer member in at least a second opening of the first series;

(5) positioning the second spacer member in at least a second opening of the third series;

(6) attaching one end of the third cross member to the first spacer member; and (7) attaching an opposite end of the third cross member to the second spacer member.

2. The method of claim 1 wherein the first spacer member includes a forward peg, and step (6) includes inserting the forward peg into an end of the third cross member.

3. The method of claim 2 wherein steps (4), (5), (6) and (7) include the third cross member being positioned in a vertical plane between the vertical planes of the first and second cross members following steps (2) and (3).

4. The method of claim 1 wherein the first spacer member includes first and second rearward pegs, and step (4) includes positioning the first and second rearward pegs in the second opening of the first series and a third opening of the first series, respectively.

* * * * *